United States Patent Office 3,192,219
Patented June 29, 1965

3,192,219
PROCESS FOR PRODUCING CERTAIN NEW 1-PHENYLCYCLOHEXYLAMINE COMPOUNDS
V Harold Maddox, Huntington Woods, and Erik F. Godefroi, Detroit, Mich., assignors to Parke, Davis & Company, Detroit, Mich., a corporation of Michigan
No Drawing. Filed Apr. 4, 1960, Ser. No. 19,476
6 Claims. (Cl. 260—293)

This application is a continuation-in-part of application Serial No. 684,848, filed September 19, 1957, application Serial No. 684,855, filed September 19, 1957, application Serial No. 710,389, filed January 22, 1958, and application Serial No. 710,391, filed January 22, 1958, all now abandoned, and the invention relates to a process for producing certain new 1-phenylcyclohexylamine compounds which in their free base form have the formula,

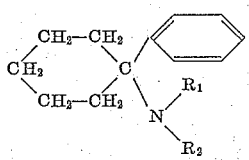

where $R_1$ and $R_2$ represent lower alkyl radicals which together contain a total of not more than five carbon atoms or $R_1$ and $R_2$ together with —N< represent a pyrrolidino, piperidino, or hexamethyleneimino radical which may contain lower alkyl substituents.

In accordance with the invention 1-phenylcyclohexylamine compounds having the above formula and salts thereof are produced by reacting a quaternary ammonium compound of formula,

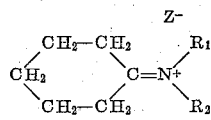

with a compound of formula,

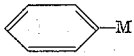

under substantially anhydrous conditions in a non-hydroxylic organic solvent and decomposing the resulting product by treatment with an aqueous medium; where $R_1$ and $R_2$ are as defined above, Z represents one equivalent of an anion of an acid and M represents an alkali metal, preferably lithium, or the radical —Mg-halogen such as —MgCl, —MgBr and —MgI, of which —MgBr is preferred. Suitable non-hydroxylic organic solvents for carrying out the first phase of the process are aliphatic ethers such as diethyl ether and dibutyl ether; aromatic hydrocarbons such as benzene, toluene and xylene; tertiary amines such as triethylamine and pyridine; and mixtures of the same.

The temperature used during the first phase of the process is not critical. In most instances, satisfactory yields are obtained at room temperature or at slightly above or below room temperature. The quantities of the two reactants is not critical. For economic reasons equivalent amounts of the two reactants or a slight excess of the phenyl alkali metal compound or phenyl magnesium halide is employed.

The second or decomposition phase of the process is carried out by treating the reaction mixture with an aqueous medium. For this purpose water alone can be used or, if desired, acidic, basic or neutral aqueous solutions such as aqueous mineral acids, aqueous alkali metal hydroxides, aqueous alkali metal carbonates, aqueous alkali metal bicarbonates, aqueous alkali metal halides, ammonium hydroxide, aqueous ammonium chloride and the like can be used. The precise nature of the aqueous medium used is unimportant since the component which reacts to bring about the desired decomposition is the water present in the medium. When an acidic aqueous medium is used the product is obtained in the form of an acid addition salt whereas when a non-acidic aqueous medium, that is, a neutral or basic medium, is used the product is obtained as the free base.

The nature of the anion Z of the quaternary ammonium compound is not critical. It may be derived from a mineral acid such as the hydrohalic, sulfuric or phosphoric acids, from a sulfonic acid such as benzene sulfonic acid and p-toluene sulfonic acid and the like.

When employing the above described process the 1-phenylcyclohexylamine compounds are usually obtained in free base form. They can be isolated from the reaction mixture either in this form or as their acid addition salts. If desired, the acid addition salts can also be prepared by reacting the isolated free base with the desired acid or by decomposing the reaction product with an acidic aqueous medium. Some examples of such acid addition salts are the mineral acid salts such as the hydrochloride, hydrobromide, sulfate and phosphate; organic acid salts such as the acetate, succinate, benzoate and p-toluene sulfonate; and salts with other strong acids such as the sulfamate.

The 1-phenylcyclohexylamine compounds and their non-toxic acid addition salts produced by the process of the invention are useful in both veterinary and human medicine as anesthetic agents. They may be administered by the oral or parenteral routes. The term "non-toxic acid addition salt" as used herein means an acid addition salt which is not substantially more toxic than an equal weight of the free base of the 1-phenylcyclohexylamine compound from which it is derived.

The invention is illustrated by the following examples.

Example 1

A mixture consisting of 170 g. of piperidine, 220 g. of cyclohexanone and 750 ml. of benzene is subjected to azeotropic distillation until the evolution of water ceases. The solution is subjected to vacuum distillation to obtain the desired 1-(1-cyclohexenyl)piperidine; B.P. 105° C. at 8 mm.

190 g. of p-toluenesulfonic acid monohydrate is suspended in 250 ml. of toluene and the mixture heated under a water trap until all the water has been removed. 165 g. of 1-(1-cyclohexenyl)piperidine in 500 ml. of ether is added to the toluene solution of p-toluenesulfonic acid at about 0 to 5° C. A solution of approximately one mole of phenyl magnesium bromide (prepared from 157 g. of bromobenzene and 24 g. of magnesium) in 750 ml. of ether is added to the slurry of the tosylate salt of 1-(1-cyclohexenyl)piperidine with stirring at about 5° C. The reaction mixture is stirred for 30 minutes after the addition has been completed and decomposed by the addition of an excess of saturated ammonium chloride and concentrated ammonium hydroxide. The ether layer is removed, dried over potassium carbonate and the ether distilled. Distillation of the residue in vacuo yields the desired 1-(1-phenylcyclohexyl)piperidine; B.P. 135–137° C. at 1 mm.; M.P. 46–46.5° C.

The hydrochloride salt is prepared by dissolving the free base in ether, treating the solution with an excess of hydrogen chloride, collecting the crude product and purifying by recrystallization from methanol-ether mixture; M.P. 243–244° C. The hydrobromide salt can be prepared in a similar manner by substituting hydrogen bromide for the hydrogen chloride used in the preparation of the hydrochloride salt.

The sulfate salt of 1-(1-phenylcyclohexyl)piperidine can be prepared by adding the free base to an alcohol solution containing one equivalent of sulfuric acid. The salt is precipitated by the addition of ether and purified by recrystallization from methanol-ether mixture.

By substituting an equivalent amount of pyrrolidine, 3-ethyl-3-methylpyrrolidine, 3-methylpiperidine, 4-methylpiperidine or hexamethyleneimine for the piperidine in the above described procedure one obtains 1-(1-phenylcyclohexyl)pyrrolidine (B.P. 114–23° C. at 0.14 mm.; M.P. 44–5° C.; M.P. of hydrochloride 235–7° C.), 1-(1-phenylcyclohexyl)-3-ethyl-3-methylpyrrolidine (B.P. 126–30° C. at 0.14 mm.), 1-(1-phenylcyclohexyl)-3-methylpiperidine (B.P. 123–6° C. at 0.2 mm.; M.P. of hydrochloride 210–1° C.); 1-(1-phenylcyclohexyl)-4-methylpiperidine (B.P. 128° C. at 0.13 mm.; M.P. of hydrochloride 215–6° C.) and 1-(1-phenylcyclohexyl)hexamethyleneimine (B.P. 137–40° C. at 0.23 mm.; M.P. of hydrochloride 205–6° C.), respectively.

If desired, an equivalent amount of phenyl magnesium iodide can be substituted for the phenyl magnesium bromide in any of the foregoing procedures.

*Example 2*

A solution consisting of 98 g. of cyclohexanone, 100 g. of piperidine, 1 to 2 g. of p-toluene sulfonic acid monohydrate and 300 ml. of toluene is refluxed under a water trap for twelve hours and then 250 ml. of the solution removed by distillation. The residue which contains the 1-(1-cyclohexyl)piperidine is diluted with 2 liters of dry toluene and dry hydrogen bromide is passed into the solution with stirring and cooling until it is just acid. The solution so obtained contains the desired quaternary ammonium compound of formula,

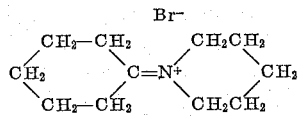

which is used as the starting material.

A solution of phenyl magnesium bromide is prepared from 38 g. of magnesium turnings, 236 g. of bromobenzene and sufficient anhydrous ether to bring the volume to 1.5 liters. The phenyl magnesium bromide solution is cooled to 10° C. and the toluene solution of the quaternary ammonium compound added as rapidly as possible with stirring and cooling. The reaction mixture is stirred for thirty minutes and the addition compound decomposed by the cautious addition of 300 ml. of water. 300 ml. of 48% hydrobromic acid is added to the mixture containing the free base of 1-(1-phenylcyclohexyl)piperidine with stirring and cooling. The mixture is chilled and the 1-(1-phenylcyclohexyl)piperidine hydrobromide collected by filtration and recrystallized from the minimum amount of hot water; M.P. 225–6° C. Alternatively, the decomposition phase may be carried out by cautiously adding the reaction mixture to 600 ml. of 24% hydrobromic acid.

The 1-(1-phenylcyclohexyl)piperidine hydrobromide can be converted to 1-(1-phenylcyclohexyl)piperidine hydrochloride as follows: 199 g. of the hydrobromide salt is dissolved in 1 liter of hot water, the solution treated with an excess of sodium hydroxide solution and the free base of 1-(1-phenylcyclohexyl)piperidine extracted with 700 ml. of benzene. The benzene solution is removed, concentrated to about 400 ml. by distillation and the cooled residue treated with an excess of isopropanolic hydrogen chloride. The solution is diluted with 1 liter of ether, cooled and the 1-(1-phenylcyclohexyl)piperidine hydrochloride collected; M.P. 234–234.5° C.

*Example 3*

A solution consisting of 200 g. of ethyl-n-propylamine, 200 g. of cyclohexanone and 750 ml. of benzene is refluxed under a water trap until no further water is evolved. The benzene is removed by distillation and the residue distilled under reduced pressure to obtain the desired (1-cyclohexenyl)-ethyl-n-propylamine.

A dry solution of p-toluenesulfonic acid is prepared by refluxing 190 g. of p-toluenesulfonic acid monohydrate in 250 ml. of toluene under a water trap until the solution is anhydrous. 167 g. of (1-cyclohexenyl)-ethyl-n-propylamine in 500 ml. of ether is added with stirring to the cold solution of p-toluene sulfonic acid in toluene. The resulting mixture which contains the quaternary ammonium compound having the formula,

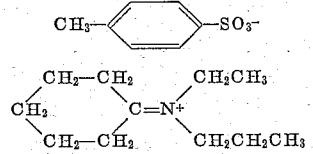

is stirred and cooled well and one mole of phenyl magnesium bromide in 750 ml. of ether is added as rapidly as possible. The reaction mixture is stirred for thirty minutes after the addition has been completed and decomposed by a treatment with sufficient saturated ammonium chloride and concentrated ammonium hydroxide to dissolve all of the inorganic material. The ether layer is removed, dried and the ether evaporated. Distillation of the residue under reduced pressure yields the desired (1-phenylcyclohexyl)ethyl-n-propylamine.

The hydrochloride salt of (1-phenylcyclohexyl)-ethyl-n-propylamine can be prepared by dissolving the free base in ether and treating the resulting solution with an excess of dry hydrogen chloride. The precipitated salt is collected and purified by recrystallization from isopropanol-ether mixture. The hydrobromide salt of (1-phenylcyclohexyl)ethyl-n-propylamine can be prepared in the same manner by using dry hydrogen bromide instead of dry hydrogen chloride.

The p-toluenesulfonate salt of (1-phenylcyclohexyl)ethyl-n-propylamine can be prepared by adding an ethanol solution of the free base to an ethanol solution containing an excess of p-toluenesulfonic acid. The salt is precipitated by the addition of ether and purified by recrystallization from methanol-ether mixture.

*Example 4*

142 g. of iodomethane in 150 ml. of ether is added to a solution of 125 g. of cyclohexylidene-ethylamine (prepared by the action of ethylamine on cyclohexanone) in 150 ml. of ether and the resulting solution warmed to 30° C. for two hours with occasional stirring. The reaction mixture which contains the desired quaternary ammonium compound of formula,

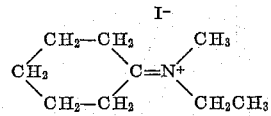

is then heated briefly on a steam bath and then diluted with 750 ml. of ether. A solution of one mole of phenyl lithium in 750 ml. of ether is added to the mixture containing the quaternary ammonium compound while stirring and cooling and the resulting mixture stirred and refluxed for 30 minutes after the addition has been completed. The reaction mixture is decomposed by the cautious addition of 500 ml. of water and the ether layer is removed and dried. The ether is distilled and the residue is subjected to distillation in vacuo to obtain the desired (1-phenylcyclohexyl)ethylmethylamine; B.P. 105–8° C. at 0.12 mm.

The hydrochloride salt of (1-phenylcyclohexyl)ethylmethylamine can be prepared by dissolving the free base in ether and treating the resulting solution with an excess of isopropanolic hydrogen chloride. The salt is collected and purified by recrystallization from isopropanol-ether; M.P. 194–5° C.

We claim:
1. Process for the production of a 1-phenylcyclohexyl-amine compound having in the free base form the formula,

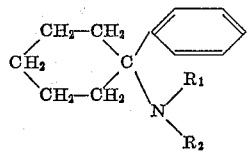

which comprises reacting a quaternary ammonium compound of formula,

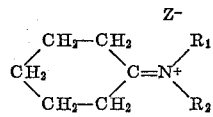

with a compound of formula,

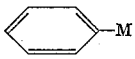

under substantially anhydrous conditions in a non-hydroxylic organic solvent and decomposing the resulting product by treatment with an aqueous medium; where $R_1$ and $R_2$ are members of the class consisting of alkyl radicals which together contain a total of not more than five carbon atoms and further members wherein $R_1$ and $R_2$ together with —N< represent pyrrolidino, piperidino and hexamethyleneimino and lower alkyl derivatives thereof, Z represents one equivalent of an anion of an acid and M is a member of the class consisting of alkali metals and the radical —Mg-halogen.

2. Process for the production of a 1-phenylcyclohexyl-amine compound having in the free base form the formula,

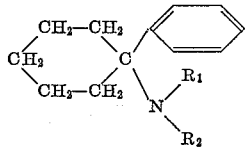

which comprises reacting a quaternary ammonium compound of formula,

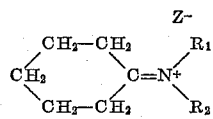

with a compound of formula,

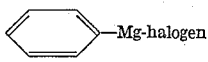

under substantially anhydrous conditions in a non-hydroxylic organic solvent and decomposing the resulting product by treatment with an aqueous medium; where $R_1$ and $R_2$ are members of the class consisting of alkyl radicals which together contain a total of not more than five carbon atoms and further members wherein $R_1$ and $R_2$ together with —N< represent pyrrolidino, piperidino and hexamethyleneimino and lower alkyl derivatives thereof and Z represents one equivalent of an anion of an acid.

3. Process for the production of 1-(1-phenylcyclohexyl)piperidine which comprises reacting a quaternary ammonium compound of formula,

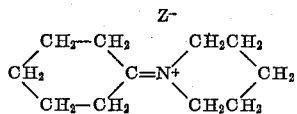

with a phenyl magnesium halide under substantially anhydrous conditions in a non-hydroxylic organic solvent and decomposing the resulting product by treatment with a non-acidic aqueous medium; where Z is one equivalent of an anion of an acid.

4. Process for the production of a non-toxic acid addition salt of 1-(1-phenylcyclohexyl)piperidine which comprises reacting a quaternary ammonium compound of formula,

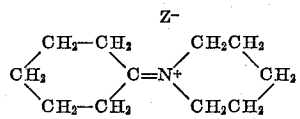

with a phenyl magnesium halide under substantially anhydrous conditions in a non-hydroxylic organic solvent and decomposing the resulting product by treatment with an acidic aqueous medium; where Z is one equivalent of an anion of an acid.

5. Process for the production of a non-toxic mineral acid salt of 1-(1-phenylcyclohexyl)piperidine which comprises reacting a quaternary ammonium compound of formula,

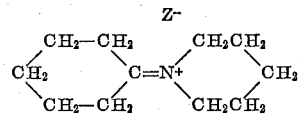

with phenyl magnesium bromide under substantially anhydrous conditions in a non-hydroxylic organic solvent and decomposing the resulting product by treatment with an aqueous mineral acid; where Z is one equivalent of an anion of an acid.

6. Process for the production of a 1-phenylcyclohexyl-amine compound having in the free base form the formula,

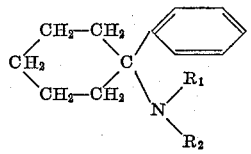

which comprises reacting a quaternary ammonium compound of formula,

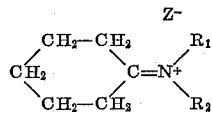

with a phenyl magnesium halide under substantially anhydrous conditions in a non-hydroxylic organic solvent and decomposing the resulting product by treatment with an aqueous medium; where $R_1$ and $R_2$ are alkyl radicals which together contain a total of not more than five carbon atoms and Z is one equivalent of an anion of an acid.

References Cited by the Examiner

Kharasch et al: Grignard Reactions of Nonmetallic Substances (textbook) (1954), pages 1251–1255.

Reiber et al.: Journal of the American Chemical Society, vol. 62, pages 3028 and 2020 (1940).

NICHOLAS S. RIZZO, *Primary Examiner.*
DUVAL T. McCUTCHEN, *Examiner.*